T. B. WICKHAM.
CORN-PLANTER.
No. 174,044. Patented Feb. 22, 1876.
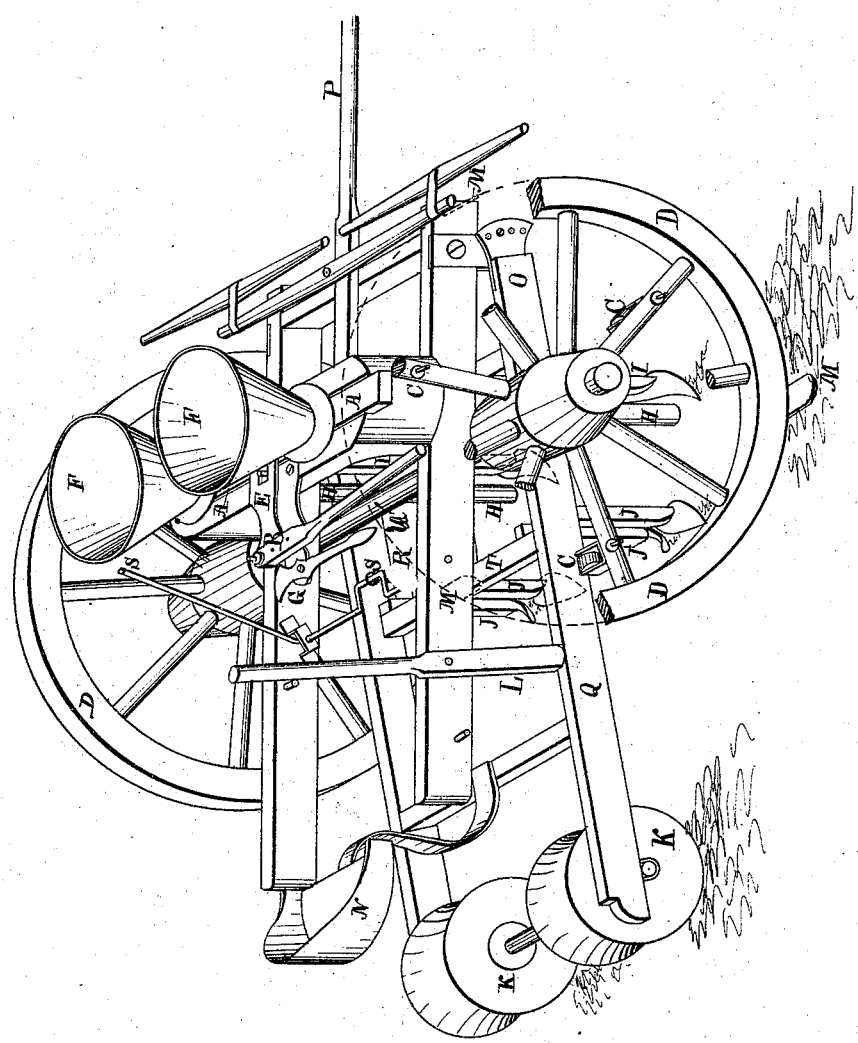
Witnesses:
Jonathan Rees.
Howard Chester.
Inventor:
Thos. B. Wickham.

UNITED STATES PATENT OFFICE.

THOMAS B. WICKHAM, OF NEWARK, OHIO.

IMPROVEMENT IN CORN-PLANTERS.

Specification forming part of Letters Patent No. 174,044, dated February 22, 1876; application filed September 30, 1875.

*To all whom it may concern:*

Be it known that I, THOMAS B. WICKHAM, of Newark, in the county of Licking and State of Ohio, have invented a certain Improvement in Corn-Planters, of which the following is a specification:

This invention relates to that kind of wheel corn-planters in which the seed-slide is operated by the alternate action of cams or rollers on one of the wheels through an intermediate lever and a spring which retracts it, and in which the openers, coverers, and rollers are connected to an independent pivoted and adjustable frame, markers being also attached to the machine for imprinting marks on the ground in line with the hills of corn planted.

My improvement consists, first, in the combination of a lock-lever with the lever which acts on the seed-slide, so disposed that it may hold the seed-slide lever locked against the stress of the spring in such a position that the rollers on the wheels may pass without acting on it, and the dropping of seed be suspended; second, in the combination, with the pivoted frame and the main frame of the machine, of a lever adapted for first lifting and then supporting the main frame so as to raise the wheels slightly off the ground, in order that the wheel with the markers may be turned, on starting a return-row, to bring the markers in line with the transverse line of hills of corn previously planted and marked, so that the machine on proceeding will plant in check-rows.

The annexed drawing is a perspective view of my improved corn-planter.

The main frame of the machine is secured to the axle U', the journals of which rest in boxes in the hubs of the wheels D D, which revolve loosely on said journals. The machine illustrated is adapted to plant two rows of corn at the same time, the corn being placed in hoppers F F, mounted the proper distance apart on a stand on the main frame. The seed-slide A moves in a way in this stand under the hopper-bottoms, it being provided with a seed-cup for each hopper, which are alternately brought under the hoppers to be filled with seed and drawn from under it to discharge the seed into the flexible seed-spouts H H through suitable fixed conductors attached to the hopper-stand a little to one side of the hoppers. A spring (not shown) under the seed-slide tends to hold the latter so that its seed-cups will register with the conductors referred to. A bell-crank or lever, B, pivoted upon a rearwardly-extending bracket of the hopper-stand has one arm connected by a pin and slot to the seed slide. Its other arm extends laterally to within a short distance of the inner face of one of the wheels of the machine. The wheel adjacent to this arm of the lever has a series of anti-friction rollers, C, attached to the inner face of its spokes, which rollers alternately strike the end of the lever, turning it sufficiently before they escape from it to cause it to move the seed-slide until its cups register with the hopper-bottoms. The moment a roller passes the end of the lever the spring will return the seed-slide and lever B to their normal position, the seed taken from the hoppers being discharged through the spouts into the ground. The rollers are properly spaced, so that hills of seed will be dropped at regular intervals the required distance apart. Markers M are also secured to the rim of this wheel in such relation to the rollers C that they will make an impression on the ground each time the seed-slide drops seed, and in line with the hills. A hand-lever, G, is pivoted on the bracket behind the lever B, it having a cam-shaped head so formed that, by turning it at right angles, or nearly so, to the laterally-extending arm of lever B, it will throw the latter out of the path or range of the rollers C, and lock it in that position, when the seed-slide remains stationary on propelling the machine in either direction. Q refers to a hinged frame, pivoted at its forward end by pins passing through clevises O O on its side beams to pendants on the main frame, a series of holes being formed both in the clevises and pendants for vertical adjustment of the hinged frame at its forward end. This hinged frame carries the opener-shovels I I arranged directly in front of the seed-spouts H H, the coverer-shovels J J some little distance in rear of the seed-spouts, and the concave-treaded rollers K K, placed at its rear end, and used for packing the loose earth around the hills. The vertical adjustability at the front end of the hinged frame enables the operator to regulate the depth to which the openers shall enter the soil. The driver's seat N is mounted on a cross-bar near the rear end of the hinged frame. The weight of the driver thus acts in holding the frame down, increasing the effectiveness of the packing-rollers. The hinged frame is connected by a chain, R, to the crank of a tranverse shaft on the main frame, and the crank-shaft provided with a hand-lever in reach of the driver. By turning this hand-lever down the driver can raise the hinged frame so as to lift the openers, coverers, and rollers above ground in turning at the end of the rows, or in moving the machine from one place to another. The lever L, pivoted on one of the side beams of the main frame directly above the corresponding side beam of the hinged frame, is used to lift the main frame and its wheels, when the hinged frame is down, so as to just clear the wheels off the ground. In turning this lever up into a vertical position, it will with its lower arm bear on the hinged frame, and support the main frame in an elevated position, like a prop. This feature is useful, because it provides for a convenient adjustment of the marking-wheel, with reference to the previously-made check-marks, on starting to plant return-rows.

What I claim as my invention, and desire to secure by Letters Patent, is—

1. The combination, substantially as specified, of the seed-slide, the lever for operating it, and the lock-lever, having a cam-shaped head.

2. The combination, substantially as specified, of the main frame, the hinged frame, and the combined lever and prop for first lifting and then supporting the main frame.

THOS. B. WICKHAM.

Witnesses:
JONATHAN REES,
HOWARD CHESTER.